United States Patent [19]
Hetzel

[11] 3,873,622
[45] Mar. 25, 1975

[54] PREPARATON OF CYCLIC DIKETONES INCLUDING INTERMEDIATES THEREFOR

[75] Inventor: Donald S. Hetzel, New London, Conn.

[73] Assignee: Pfizer Inc., New York, N.Y.

[22] Filed: Apr. 17, 1972

[21] Appl. No.: 244,940

[52] U.S. Cl. .................. 260/586 P, 260/448.2 N
[51] Int. Cl. ............................................. C07c 45/00
[58] Field of Search ................. 260/586 B, 448.8 R

[56] References Cited
OTHER PUBLICATIONS
"Organosilicon Compounds," Eaborn, (1960), p. 314.

*Primary Examiner*—Leon Zitver
*Assistant Examiner*—A. Siegel
*Attorney, Agent, or Firm*—Connolly and Hutz

[57] ABSTRACT

Preparation of 3,5-disubstituted and 4-substituted cyclopentane-1,2-diones via cyclization of appropriate glutarate diesters to bis-silyl ethers of the corresponding 1-cyclopentene-1,2-diol compounds which are then oxidized to the desired cyclic diones is described.

6 Claims, No Drawings

PREPARATON OF CYCLIC DIKETONES INCLUDING INTERMEDIATES THEREFOR

BACKGROUND OF THE INVENTION

The synthesis of some cyclic diketones isolated from the oil obtained from coffee beans was reported by Gianturco, M. A. and Friedel, P., Tetrahedron 19, No. 12, 2,039–2,042 (1963). The preparation of these compounds was achieved by decarboxylative hydrolysis of the appropriate glutarate with diethyl oxalate as described in Liebigs Ann. 563, 31 and 37 (1949). This work was of great interest to researchers in the field of flavors and fragrances.

These methods for preparing cyclic diketones, including 3,5-disubstituted and 4-substituted cyclopentane-1,2-diones, as well as the methods described by Staudinger, H. and Ruzicka, L., Helv. Chim. Acta. 7, 377 (1924) and Lichtenberger, J. and Gabriel, G., Bull. Soc. Chim. France 4, 1978 (1937) suffer from the disadvantages of involved reaction sequences which produce undesired by-products and require extensive purification procedures, with consequential low yields. The process of the present invention is relatively simple procedurally and high yields of relatively pure products are obtained.

SUMMARY OF THE INVENTION

This invention is concerned with a process for preparing compounds of the formulae:

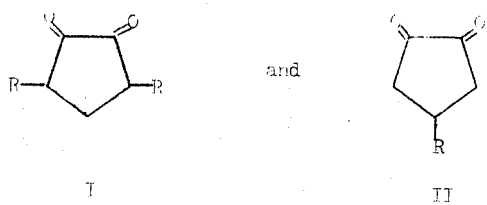

wherein R is alkyl containing from 1 to 6 carbon atoms, alkenyl containing 2 to 6 carbon atoms or benzyl, which comprises contacting an appropriate 2,4-disubstituted glutarate diester (for compounds of Formula I) or 3-substituted glutarate diester (for compounds of Formula II) in an anhydrous, reaction-inert solvent with metallic sodium and a silyl compound selected from those of the formulae

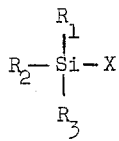

wherein $R_1$, $R_2$ and $R_3$ are each selected from the group consisting of fluorine, bromine, chlorine, alkyl of 1 to 6 carbon atoms, phenyl, benzyl, tolyl and dimethylaminophenyl, at least one of the said R groups being other than fluorine, chlorine and bromine, X is selected from the group consisting of fluorine, bromine, chlorine and

$R_4$ is selected from the group consisting of hydrogen and alkyl of 1 to 6 carbon atoms, $R_5$ is selected from the group consisting of hydrogen, alkyl of 1 to 6 carbon atoms and

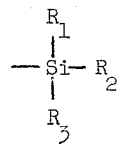

to form the bis-silyl ether of the corresponding 1-cyclopentene which is oxidized to the cyclic dione. These cyclic diones impart desirable flavors to tobacco, beverages, confections and food compositions.

DETAILED DESCRIPTION OF THE INVENTION

This invention is concerned with the preparation of substituted cyclopentane-1,2-diones and their use as flavorants in foods, beverages, candy and tobacco, as flavor enhancers in a variety of prepared foods and spices and as perfumants in cosmetic compositions. The present invention involves a unique application of the acyloin synthesis to the preparation of 3,5-disubstituted and 4-substituted cyclopentane-1,2-diones whereby an appropriate glutarate diester cyclized to a bis-silyl ether of the 1-cyclopentene-1,2-diol which is then oxidized to the desired cyclic dione. This process is applicable to the preparation of known 3,5-disubstituted and 4-substituted cyclopentane-1,2-diones and to others not previously reported.

The procedure has the advantage of providing the bis-silyl ether intermediate which is readily isolated in the form of a stable, distillable liquid. The overall synthesis involves few steps, inexpensive reagents and proceeds smoothly with excellent yield of desired product in high purity.

The novel bis-silyl ether intermediates, which also form part of the present invention, are those 4-substituted and 3,5-disubstituted-1-cyclopentene-1,2-diol-bis-silyl ethers wherein the silyl substituents are each of the formula

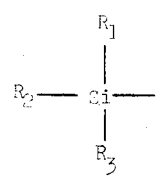

wherein $R_1$, $R_2$ and $R_3$ are each fluorine, chlorine, bromine, alkyl of 1 to 6 carbon atoms, phenyl, benzyl, tolyl or dimethylaminophenyl, at least one of the R groups being other than fluorine, bromine and chlorine, and wherein said 4-substituents and said 3,5-disubstituents are alkyl of 1 to 6 carbon atoms, alkenyl of 2 to 6 carbon atoms or benzyl.

The ester groups in the glutarate diesters may be alkyl of 1 to 6 carbon atoms, benzyl or phenyl. The 2,4-disubstituted glutaric acid diesters can be prepared by the general method described in Acta Chem. Scandia 12, 314 (1958). The 3-substituted glutaric acid diesters can be prepared by the general method described in Organic Syntheses Collection, Vol. III, 591.

The appropriately substituted glutarate diester is cyclized by treatment in an anhydrous, reaction-inert solvent, e.g., the xylenes, toluene or benzene, to the cyclic ene-diol which is trapped by a silyl compound as the bis-silyl ether. Potassium metal may be used in place of sodium metal but it is more difficult to handle. The proportions of sodium metal and silyl compound are not critical, but these are preferably added in excess, e.g., about 4 to 10 molar equivalents per mole of glutarate diester.

The preferred silyl compound is trimethyl chlorosilane. Examples of other suitable silyl compounds are hexamethyl disilazane, triethyl chlorosilane, methyl trichlorosilane, tri-n-propyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, tri-p-dimethylaminophenyl chlorosilane, N-ethyl triethylsilylamine, hexaethyl disilazane, triphenyl silylamine, tri-n-propyl silylamine, tetraethyl dimethyl disilazane, tetramethyl diethyl disilazane, tetramethyl di-phenyl disilazane, hexaphenyl disilazane, hexa-p-tolyl disilazane, triethylsilylacetamide and bis-trimethylsilylacetamide. Many of these compounds are available commercially or they may be prepared as described in Organosilicon Compounds (Academic Press).

The cyclization reaction is conveniently run in a flask fitted with condenser, mechanical stirrer and dropping funnel. The flask is charged with an anhydrous, reaction-inert solvent, preferably toluene. After addition of sodium metal pellets, the mixture is heated to a temperature at least sufficient to disperse the sodium as the liquefied metal (97°–98°C.). The boiling point of toluene is 110.6°C. The boiling point of o-xylene is 144°C., the highest of the xylenes. It is convenient if one of these solvents is employed to conduct the reaction at reflux temperature. With vigorous stirring, the silyl compound is added, followed by the approximately substituted glutaric acid diester. The reaction mixture is stirred at reflux until the cyclization is substantially complete, which may require approximately 10 to 15 hours. It is then desirable to isolate the bis-silyl ether before proceeding with the oxidation step. This is conveniently accomplished by cooling the reaction mixture, filtering to remove salts and distilling the bis-silyl ether under vacuum. Alternate procedures for the isolation will readily occur to those skilled in the art.

The bis-silyl ether is oxidized in good yield to the corresponding diketone by stirring for several hours, preferably about 1 to 3 hours, at about 60° to 80°C., preferably 70°–75°C., with an oxidizing agent. The oxidizing agent may be selected from a variety of such compounds as ferric chloride, bismuth oxide, chromic acid or a cupric salt, e.g., cupric nitrate, cupric sulfate, cupric phosphate or, preferably, cupric acetate. The oxidizing agent is desirably employed in excess, e.g., approximately 3 to 6 molar equivalents per mole of ether. The acid may be a mineral acid such as hydrochloric, sulfuric or phosphoric acid or an organic acid such as one of the lower alkanoic acids, preferably acetic acid, suitably at a concentration of about 25 to 75% w/v, preferably about 50% w/v. Although not critical to the process, a small amount of methanol may be added to aid in the solubilization of the bis-silyl ether.

The cyclic diketone may be isolated from the reaction mixture by the various procedures known to those skilled in the art. A convenient method, after cooling and filtration, is to extract the solution several times with ether, wash the combined ether extracts with sodium bicarbonate and saturated sodium chloride solutions, dry over anhydrous sodium sulfate and evaporate to dryness. The crude cyclic diketone, if a solid, may be purified by crystallizing from a suitable solvent; if a liquid, by distilling under vacuum.

The methods for employing the compounds of this invention in compounding flavors for beverages, confections and food compositions are described in U.S. Pat. No. 3,628,970. The test compound is incorporated at levels of 2–200 ppm in synthetic caramel flavors, synthetic coconut flavors, chocolate milk drinks, bakery formulations, variety of food compositions and carbonated beverages. Organoleptic evaluations are conducted by experienced panels of judges.

The following examples are given by way of illustration and are not to be construed as limitations of this invention, variations of which are possible without departing from the spirit or scope thereof.

EXAMPLE I

Intermediate:
3,5-Dimethyl-1,2-bistrimethylsiloxy-1-cyclopentene

To a 3-liter flask fitted with condenser, mechanical stirrer, nitrogen inlet and dropping funnel was charged 800 ml toluene and 15.2 gms. (0.66 moles) sodium metal pellets. This mixture was brought to reflux and stirred vigorously while 78 gms. (0.72 moles) of trimethyl chlorosilane was added followed by 27 gms. (0.12 moles) of 2,4-dimethyl glutaric acid diethyl ester (prepared according to Ekerson, Acta Chem. Scandia, 12, 341, 1958). The reaction was stirred at reflux 12 hours, then cooled and filtered to remove salts. Distillation afforded 17.8 gms. of clear liquid b.p. 105°–121°/22mm.

Compound: 3,5-Dimethyl cyclopentane-1,2-dione

A mixture of 16.4 gms. cupric acetate dihydrate (0.082 moles), 3.5 ml methanol, 41 ml of 50% aqueous acetic acid and 7.0 gms. (0.025 moles) of 3,5-dimethyl-1,2-bistrimethylsiloxy-1-cyclopentene was stirred for 2 hours at 75°. After cooling and filtration, the red reaction solution was extracted thoroughly with ether (3 × 20 ml.). The combined ether extracts were washed with 5% sodium bicarbonate and saturated sodium chloride solutions, dried over sodium sulfate and evaporated to yield gummy crystals. Recrystallization from hexane afforded white crystals, 0.42 gms. mp. 88°–90°.

EXAMPLE II

Example I may be repeated, with comparable results, replacing cupric acetate with cupric sulfate, cupric nitrate, cupric phosphate, ferric chloride, bismuth oxide and chromic acid.

EXAMPLE III

Example I may be repeated, with comparable results, replacing acetic acid with formic acid, propionic acid and butyric acid.

EXAMPLE IV

The method of Example I was repeated with 2,4-diethyl glutaric acid diethyl ester in place of 2,4-dimethyl glutaric acid diethyl ester to yield 3,5-diethyl-1,2-bistrimethylsiloxy-1-cyclopentene (b.p. 130°–135°/18 mm) which was oxidized to give 3,5-diethyl cyclopentane-1,2-dione (b.p. 63°–67°/0.4 mm).

EXAMPLE V

Intermediate:
4-Ethyl-1,2-bistrimethylsiloxy-1-cyclopentene

To a 1-liter flask fitted with condenser, mechanical stirrer, nitrogen inlet and dropping funnel was added 400 ml of dry toluene and 4.6 gms. (0.2 moles) of sodium metal pellets. After vigorous stirring at reflux for 1.5 hours, a solution of 9.6 gms. (0.045 moles) of 3-ethyl glutaric acid diethyl ester (Organic Syntheses Coll. Vol. III, 591) and 26 gms. (0.25 moles) of trimethyl chlorosilane in 100 ml of toluene was added dropwise over a period of 1 hour. After 15 hours of reflux, the reaction was cooled, filtered to remove salts and distilled to afford 4.3 gms. of liquid, b.p. 108°–119°/20 mm.

Compound 4-Ethyl cyclopentane-1,2-dione

The 4-ethyl-1,2-bistrimethylsiloxy-1-cyclopentene was oxidized by the method of Example I to yield 4-ethyl cyclopentane-1,2-dione (b.p. 75°/1 mm).

EXAMPLE VI

The method of Example IV may be repeated in turn with 3-methyl, 3-hexyl, 3-allyl, 3-hexenyl and 3-benzyl glutaric acid diethyl esters to yield the corresponding 4-substituted cyclopentane-1,2-diones.

EXAMPLE VII

The method of Example I may be repeated in turn with 2,4-dihexyl, 2,4-diallyl, 2,4-dihexenyl and 2,4-dibenzyl glutaric acid diethyl esters to yield the corresponding 3,5-disubstituted cyclopentane-1,2-diones.

EXAMPLE VIII

The foregoing examples may be repeated with comparable results, replacing the 2,4-disubstituted and 3-substituted glutaric acid diethyl esters with the corresponding 2,4-disubstituted and 3-substituted glutaric acid dimethyl, dipropyl, dihexyl, diphenyl and dibenzyl esters.

EXAMPLE IX

The foregoing examples may be repeated, with comparable results, replacing trimethyl chlorosilane in turn with each of the following: hexamethyl disilazane, triethyl chlorosilane, methyl trichlorosilane, tri-n-propyl chlorosilane, tri-n-butyl chlorosilane, methyl diethyl chlorosilane, dimethyl ethyl chlorosilane, phenyl dimethyl bromosilane, benzyl methyl ethyl chlorosilane, phenyl ethyl methyl chlorosilane, triphenyl chlorosilane, triphenyl fluorosilane, tri-o-tolyl chlorosilane, tri-p-dimethylaminophenyl chlorosilane, N-ethyl triethylsilylamine, hexaethyl disilazane, triphenyl silylamine, tri-n-propyl silylamine, tetraethyl dimethyl disilazane, tetramethyl diethyl disilazane, tetramethyl diphenyl disilazane, hexaphenyl disilazane, hexa-p-tolyl disilazane, triethylsilylacetamide and bis-trimethylsilylacetamide.

EXAMPLE X

The methods for evaluating the compounds of this invention in compounding flavors for beverages and confections, as well as edible food compositions in general, are described in U.S. Pat. No. 3,628,970.

For the evaluation of the flavoring effects of these compounds in tobacco, 10 gram samples of cigarette tobacco (Laredo-Brown Tobacco Corp.) are treated with varying levels of each compound, ranging from 50 to 1,000 ppm. Each of the treated tobacco samples is rolled into filter tip cigarettes. For each tested level of the compound, an untreated sample (control) is also prepared. The treated cigarettes and the controls are evaluated by an experienced panel of smokers.

The data from the cigarette tobacco tests indicate that 3,5-diethyl cyclopentane-1,2-dione is the most potent flavoring compound of all those tested. Within the range of 100–500 ppm, the compound is judged to give the tobacco a more desirable, milder and smoother flavor.

The cyclopentane-1,2-diones evaluated in the compounding tests for beverages, confections and edible food compositions produce flavorable flavoring effects, with the 3,5-disubstituted compounds active at lower levels than the 4-substituted compounds. At concentrations of 2 to 2,000 ppm, 3,5-diethyl cyclopentane-1,2-dione is the most active of all the compounds tested.

What is claimed is:

1. A process for preparing 4-substituted and 3,5-disubstituted cyclopentane-1,2-diones which comprises contacting 3-alkyl, 3-alkenyl, 3-benzyl, 2,4-dialkyl, 2,4-dialkenyl or 2,4-dibenzyl glutaric acid dialkyl, diphenyl or dibenzyl ester in an anhydrous, reaction-inert solvent with metallic sodium and a silyl compound of the formula

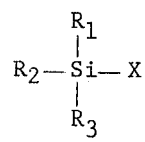

to form the bis-silyl ether of the 1-cyclopentene-1,2-diol, isolating said ether from its reaction mixture and contacting said ether with an oxidizing agent selected from the group consisting of ferric chloride, bismuth oxide, chromic acid, cupric nitrate, cupric sulfate, cupric phosphate and cupric acetate in aqueous acid solution, wherein $R_1$, $R_2$ and $R_3$ are each selected from the group consisting of fluorine, bromine, chlorine, alkyl, phenyl, benzyl, tolyl and dimethylaminophenyl, at least one of said $R_1$, $R_2$ and $R_3$ being other than fluorine, bromine or chlorine and X is selected from the group consisting of fluorine, bromine, chlorine and

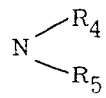

wherein $R_4$ is hydrogen or alkyl and $R_5$ is hydrogen, alkyl or

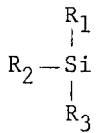

each of said alkyl moieties having from 1 to 6 to carbon atoms and each of said alkenyl moieties having from 2 to 6 carbon atoms.

2. The process of claim 1 wherein said oxidizing agent is cupric acetate.

3. The process of claim 1 wherein said acid is acetic acid.

4. The process of claim 1 wherein said reaction-inert solvent is toluene.

5. The process of claim 1 wherein said silyl compound is trimethyl chlorosilane.

6. The process of claim 1 wherein said cyclopentane-1,2-dione is 3,5-diethyl cyclopentane-1,2-dione.

* * * * *